US012785394B2

(12) United States Patent
Mohajerani et al.

(10) Patent No.: US 12,785,394 B2
(45) Date of Patent: Nov. 3, 2026

(54) INVERTER WITH POWER SOURCE IDENTIFICATION LEARNING FEATURE

(71) Applicant: Rivian IP Holdings, LLC, Irvine, CA (US)

(72) Inventors: Zahra Mohajerani, Los Angeles, CA (US); Mohammad Nanda Rahmana Marwali, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 390 days.

(21) Appl. No.: 18/374,240

(22) Filed: Sep. 28, 2023

(65) Prior Publication Data

US 2025/0112463 A1 Apr. 3, 2025

(51) Int. Cl.

| | |
|---|---|
| ***H02J 3/007*** | (2026.01) |
| ***H02J 9/06*** | (2006.01) |
| ***H02J 13/34*** | (2026.01) |
| ***H02J 103/35*** | (2026.01) |
| ***H02M 1/10*** | (2006.01) |

(52) U.S. Cl.

CPC .............. *H02J 3/007* (2020.01); *H02J 9/062* (2013.01); *H02J 9/068* (2020.01); *H02J 13/34* (2026.01); *H02M 1/10* (2013.01); *H02J 2103/35* (2026.01)

(58) Field of Classification Search

CPC .. H02J 3/007; H02J 9/062; H02J 9/068; H02J 13/00036; H02J 2203/10; H02J 2300/24; H02J 3/381; H02M 1/10

See application file for complete search history.

(56) References Cited

U.S. PATENT DOCUMENTS

| | | | | |
|---|---|---|---|---|
| 9,876,354 | B2 * | 1/2018 | Compton | H02J 9/062 |
| 10,998,730 | B1 * | 5/2021 | Willson | H02J 3/381 |
| 11,114,855 | B2 * | 9/2021 | Handelsman | H02J 3/007 |
| 11,641,177 | B2 * | 5/2023 | Hansen | G06Q 10/063 320/132 |
| 2002/0014802 | A1 * | 2/2002 | Cratty | H02J 1/06 307/18 |
| 2014/0253013 | A1 * | 9/2014 | Ishibashi | H02J 3/003 320/101 |
| 2015/0179059 | A1 * | 6/2015 | Carlson | E05F 15/77 340/5.61 |
| 2020/0021103 | A1 * | 1/2020 | Frampton | H02M 7/72 |
| 2020/0052613 | A1 * | 2/2020 | Garrity | H02J 3/008 |
| 2021/0083581 | A1 * | 3/2021 | Becnel | H02J 1/102 |
| 2023/0246477 | A1 * | 8/2023 | Pahlevaninezhad | H02J 3/32 307/24 |

* cited by examiner

*Primary Examiner* — Ziaul Karim
(74) *Attorney, Agent, or Firm* — HG Law LLP

(57) ABSTRACT

An inverter is disclosed that includes inverter settings that adjust how power is received and provided by the inverter based on an identified source of the power. The inverter includes a port configured to receive power from a source, a memory to store reference source characteristics for a plurality of power sources, and control circuitry configured to analyze the power to determine one or more characteristics associated with the source, compare the determined one or more characteristics with the reference source characteristics to identify the source, and apply an inverter setting based on the identified source.

18 Claims, 6 Drawing Sheets

INVERTER WITH POWER SOURCE IDENTIFICATION LEARNING FEATURE

INTRODUCTION

The present disclosure relates to inverters that receive power from different sources. More particularly, the present disclosure relates to inverters that adjust operation based on which source is providing power.

SUMMARY

The present disclosure is directed to inverters that receive power from a source and provide the received power to a load, where the inverters are configured to identify the source (e.g., a utility grid, a generator, a solar inverter, an uninterruptible power supply (UPS)) and apply inverter settings based on the identified source. More specifically, the present disclosure is directed to analyzing the received power to determine one or more characteristics associated with the source to identify the source and apply an inverter setting based on the identified source. For example, an inverter may adjust how the inverter receives and provides power to/from loads and the source coupled to the inverter. In some embodiments, the inverter is a bidirectional inverter.

In accordance with some embodiments of the present disclosure, systems and methods are provided for applying inverter settings of an inverter based on an identified source of power. For example, an inverter may be configured to receive, at a port, power via a breaker which provides power to the inverter from either one of a utility grid and a UPS. In such an example, the inverter is receiving power from the utility grid by way of the breaker when the utility grid is available. When the power from the utility grid becomes unavailable, changeover circuitry may automatically activate a switch such that the breaker provides power to the inverter from the UPS. The inverter, which is now receiving power from the UPS, may analyze the power for one or more characteristics associated with the UPS and identify the source as the UPS by comparing the one or more characteristics associated with the UPS with reference source characteristics stored in memory of the inverter. The inverter may be coupled to a load (e.g., an electric vehicle) and is configured to provide power to the load. Once the inverter identifies the source as a UPS, the inverter may apply an inverter setting corresponding to UPSs. In some embodiments, the inverter setting corresponding to UPSs may reduce the amount of power provided to the load in an effort to conserve power of the UPS until the utility grid becomes available.

In some embodiments, the one or more characteristics associated with the source used to identify the source may include any one or more of a voltage ripple root mean square (RMS), a voltage ripple frequency, impedance based on injected reactive current, impedance based on injected harmonic current, or impedance based on signal perturbation or a combination thereof. In some embodiments, the inverter may receive, at the port, power from any one of a generator, a solar inverter, a UPS, or a utility grid, or a combination thereof.

In some embodiments, the inverter is configured to perform a calibration routine to initialize the reference source characteristics for multiple power sources by receiving and analyzing power from a respective source and then determining one or more reference source characteristic for the respective source providing power to the inverter. In some embodiments, the stored reference source characteristics may include a source fingerprint for each power source, wherein each respective fingerprint includes one or more reference source characteristics for the power source.

In some embodiments, the inverter compares one or more determined characteristics to one or more reference source characteristics for each respective source to determine how well they match. The inverter then identifies the source corresponding to the one or more reference source characteristic that is a closest match. In some embodiments, if there is not a definitive closest match, the inverter may select a default source for which to set an inverter setting. In some embodiments, the inverter compares the one or more determined characteristics to each source fingerprint stored in memory.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION OF DRAWINGS

In some embodiments, the present disclosure is related to an inverter that receives power from a respective source among multiple available sources and provides the received power to a load. The inverter includes control circuitry, which is configured to identify the source (e.g., a utility grid, a generator, a solar inverter, or an uninterruptible power supply (UPS)) and apply inverter settings based on the identified source. More specifically, the present disclosure is directed to analyzing the received power to determine one or more characteristics to identify the source and apply an inverter setting which may adjust how the inverter receives and provides power to/from loads and the source coupled to the inverter.

In some embodiments, the sources coupled to the inverter (e.g., utility grid, generator, solar inverter, and UPS) provide alternate current (AC) power to the inverter. The inverter receives the AC power, via an AC power rail, and converts the AC power with an AC-to-DC converter in order to provide DC power to the load. In some embodiments, the converted DC power is transmitted along a DC power rail to a DC-to-DC converter. The control circuitry is communicatively coupled to the AC-to-DC converter and the DC-to-DC converter by respective signal buses to instruct the respective operation for each of the converters. When instructed by the control circuitry, the DC-to-DC converter provides DC power to one or more loads. In some embodiments, a respective load (e.g., an electric vehicle) may be used to provide DC power to the inverter if the inverter is a bi-directional inverter. This DC power sourced from the load may be converted to AC power and provided to the AC power source by converting the DC power with the AC-to-DC converter.

Figure 1:
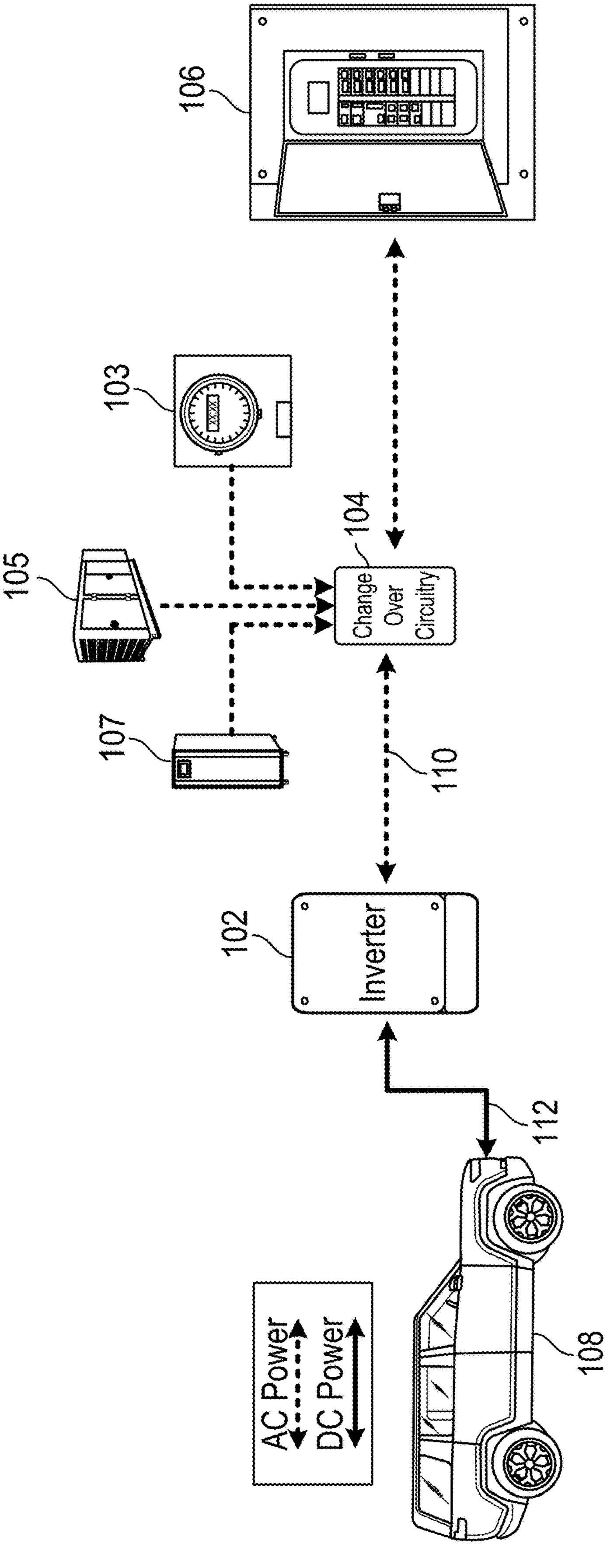
FIG. 1 shows an illustrative inverter system implemented with breaker switches and electric vehicle (EV), in accordance with an embodiment of the present disclosure.

FIG. 1 shows an illustrative inverter system 100 implemented with breaker switches (e.g., changeover circuitry 104 and breaker 106) and coupled to an electric vehicle (EV) 108, in accordance with an embodiment of the present disclosure. Inverter system 100 includes an AC power source (e.g., the utility grid 103, generator 105, solar inverter or UPS 107) coupled to inverter 102 to provide AC power to inverter 102, which provides received power to EV 108 as a load, changeover circuitry 104 which may switch which source provides AC power to inverter 102. Inverter system 100 also includes breaker 106 which acts as a switch to enable or disable AC power provisions from the utility grid. Although particular components are depicted in FIG. 1, it will be understood that other suitable loads may be coupled to inverter 102 and any suitable source (e.g., generator 105, solar inverter, or UPS 107) may provide AC power to inverter system 100. In some embodiments, multiple different loads (e.g., multiple EVs) may be concurrently coupled to the inverter 102. In some embodiments, electric vehicle 108, and any other suitable load coupled to inverter 102 is bi-directionally coupled to inverter 102 (e.g., may deliver DC power or may receive DC power) via the DC power rail 112.

The inverter system 100 receives AC power from the source (e.g., utility grid 103, generator 105, solar inverter, or UPS 107) coupled to inverter 102. The power is provided via a bi-directional AC power rail 110. In some embodiments, the AC power rail 110 is coupled to changeover circuitry 104 and breaker 106. In some embodiments, the inverter 102 receives AC power via the AC power rail 110, converts the AC power to DC power, and provides the DC power to a respective load (e.g., the electric vehicle 108). In some embodiments, inverter system 100 may include an additional breaker switch along the AC power rail 110, between the inverter 102 and the changeover circuitry 104. It will be understood that the AC power provided by the source may be susceptible to blackouts or interruptions. In some embodiments, during a blackout or interruptions of a utility grid 103, the changeover circuitry 104 may automatically actuate a switch to disable power provisions along the AC power rail 110. In such embodiments, changeover circuitry 104 may actuate a switch to source AC power from another source (e.g., generator 105, solar inverter, or UPS 107). In some embodiments, inverter 102 is capable of receiving DC power from coupled loads (e.g., EV 108) via a bi-directional DC power rail 112. In some embodiments, the EV 108 receives DC power from the inverter 102 via the DC power rail 112. In some embodiments, inverter 102 may be coupled to any suitable load (e.g., an EV) and any suitable number of loads. For example, if electric vehicle 108 and a stationary battery converter were both coupled as loads to inverter 102, the EV 108 may deliver DC power to the stationary battery converter, or the stationary battery converter may deliver DC power to the EV 108.

Figure 2:
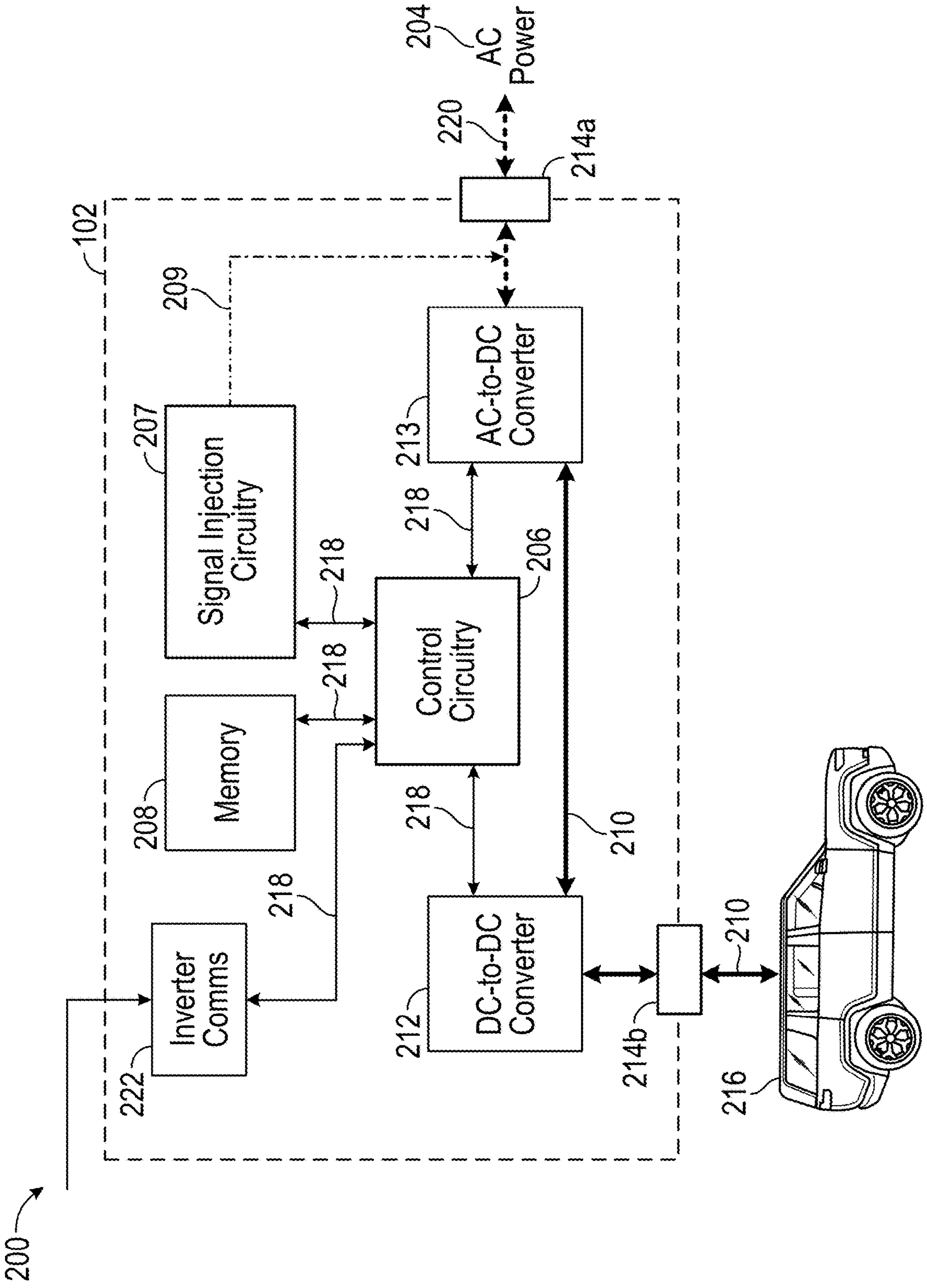
FIG. 2 shows an illustrative inverter receiving power from a source and providing power to a load (e.g., an EV), in accordance with an embodiment of the present disclosure.

FIG. 2 shows an illustrative inverter 102 receiving AC power 204 from a source and providing power to a load 216 (e.g., an EV), in accordance with an embodiment of the present disclosure. System 200 includes an inverter 102 (e.g., corresponding to inverter 102 in FIG. 1), AC power 204 from a source (e.g., utility grid 103, generator 105, solar inverter, or UPS 107 of FIG. 1), control circuitry 206, signal injection circuitry 207, memory 208, a direct current (DC) power rail 210, DC-to-DC converter 212, AC-to-DC converter 213, ports **214*a*-214*b*, load 216 (e.g., such as electric vehicle 108) coupled to inverter 102, signal buses 218, an AC power rail 220 and inverter communications 222. It will be understood that FIG. 2 is an illustrative embodiment of an inverter system 200**, so any featured component may be modified or substituted in accordance with the present disclosure.

Inverter 102 houses each of the system components mentioned above except for the load 216 and the source of AC power 204. Inverter 102 receives AC power 204 from a source via a first port **214*a* coupled to the AC power rail 220, which may be bidirectional (e.g., may deliver AC power 204 from the source or provide AC power 204 to the source). The AC-to-DC converter converts the AC power 204 received from the AC power rail 220 via the first port 214*a* to DC power. The inverter 102 is configured to provide DC power from a DC-to-DC converter 212 to load 216 (e.g., an electric vehicle) which is coupled to the inverter 102 via a second port 214*b*. In some embodiments, the source of AC power 204 may be any one of a utility grid 103, a generator 105, a solar inverter, an uninterruptible power supply (UPS) 107, or a combination thereof. In some embodiments, the inverter 102 may deliver AC power to a residence or building associated with the inverter 102 via the AC power rail 220, coupled at the first port 214*a*. The inverter 102 may deliver DC power to load 216, coupled to second port 214*b*. The DC power provided to load 216 is provided via DC-to-DC converter 212, the DC power previously converted by the AC-to-DC converter 213 from AC power 204 received from the source. In some embodiments, the DC-to-DC converter 212 is configured to convert input voltage of the DC power received via DC power rail 210 to an output voltage which is not the same as the input voltage. In some embodiments, the DC-to-DC converter 212 is bi-directional such that it may convert input voltages of DC power received from a load 216 to an output voltage of DC power provided onto the DC power rail 210, where the output voltage is different from the input voltage. In some embodiments, DC-to-DC converter 212 may be a dual active bridge converter or any suitable DC-to-DC converter which has uni- or bi-directional capabilities. It will be understood that there may be any suitable number of loads (e.g., multiple EVs) coupled to the inverter 102 of any suitable type. In some embodiments, inverter 102 may include more than one port configured to be coupled to a load, in a similar fashion to second port 214*b* and load 216. Although FIG. 2 depicts control circuitry 206 disposed internally with respect to inverter 102, it will be understood that control circuitry 206 may be external to inverter 102. In some embodiments, inverter 102 includes memory 208** that stores reference source characteristics for a plurality of power sources. In some embodiments, the control circuitry may include a processor or processing unit implemented as hardware, software, or a combination thereof.

Each of first port 214*a* and second port 214*b* may be any suitable structure or connection that enables power to be received or transmit from inverter 102. In some embodiments, each of first port 214*a* and second port 214*b* is a bolt connection or any suitable connector to be electrically coupled to each of AC power rail 220 and DC power rail 210, respectively.

Memory 208 may also include hardware elements for non-transitory storage of commands or instructions, that, when executed by control circuitry 206, cause the control circuitry 206 to analyze AC power 204 received from the source via the first port 214*a* to determine one or more characteristics of the AC power of the source, compare the determined one or more characteristics with reference source characteristics, stored in memory 208, to the identify the source of the AC power 204, and apply an inverter setting based on the identified source. Control circuitry 206 may be communicatively coupled to components of inverter 102 via signal bus 218 or via a wireless connection.

The source provides AC power 204 by AC power rail 220 to the AC-to-DC converter via first port 214*a*. The source which provides AC power 204 may be any suitable AC power source, which includes but is not limited to a generator, a solar inverter, a UPS, a utility grid, or a combination thereof. In some embodiments, the AC power 204 from the source may experience interruptions or variations in power provisions (e.g., a utility grid blackout), which may cause the power source to be changed to another type of power source. In an example of inverter 102 that receives AC power 204 from a utility grid, when a blackout of the utility grid occurs, changeover circuitry (e.g., changeover circuitry 104) may be configured to change where the AC power 204 is received from, such as receiving AC power 204 from a generator or a UPS, via the AC power rail 220. In some embodiments, the inverter 102 receives power from a stored provision of DC power which is converted by a DC-to-AC converter (e.g., such as AC power from a UPS). In some embodiments, the inverter 102 is a bidirectional inverter, configured to receive DC power from load 216 through the second port 214*b*, when, for example, the AC power 204 provided by the source has been interrupted.

An interruption or variations in power provisions of the received AC power 204 may be identified by control circuitry 206 by analyzing the AC power 204 received by inverter 102. In some embodiments, control circuitry 206 receives and analyzes sensor data indicative of at least one source characteristic of the AC power 204 from the AC-to-DC converter 213. In some embodiments, control circuitry 206 performs either time domain analysis or frequency domain analysis in order to identify variations in frequency, which may be indicative of a change in the source of AC power 204 (i.e., a change from the utility grid to the UPS). In some embodiments, sensor data includes voltage data of AC power 204. The voltage data may be analyzed to determine a drop in voltage which may be indicative of an interruption or blackout in power provisions. In some embodiments, control circuitry 206 identifies an interruption or blackout when the drop in voltage of the signal on AC power rail 220 persists longer than a predetermined amount of time (e.g., 0.5 seconds, 1 second, 1.5 seconds, etc. seconds). In some embodiments, the predetermined amount of time may be set by control circuitry 206 or a preset value.

In some embodiments, inverter communications (comms) 222 wirelessly couples to an external user device or service team device (e.g., a smart mobile phone or a smart tablet) via a software interface (e.g., a modular inverter application). It will be understood that the inverter comms 222 may connect to an external monitoring device via signal bus 218. In some embodiments, inverter comms 222 may allow the user or service team to monitor power provisions through the inverter 102 and various loads or sources coupled to the inverter 102 (e.g., load 216 and source of AC power 204) via the ports 214*a* and 214*b*. In some embodiments, inverter comms 222 may alert the user or service team of a malfunction or unexpected behavior within inverter 102 (e.g., an unsecured load not fully connected to inverter 102 or a contactor failing to actuate so a corresponding fuse cannot couple to a DC-to-DC converter 212). In some embodiments, the inverter comms 222 is used to perform an initialization process of the reference source characteristics for at least one source on the inverter 102. For example, a service member may send signals to control circuitry 206 via inverter comms 222 to select which source is coupled to 102 and analyze and store reference source characteristics for each respective source.

In some embodiments, control circuitry 206 is communicatively coupled to an AC-to-DC converter 213, the AC-to-DC converter 213 to convert AC power 204, received from the source via AC power rail 220, to DC power. Accordingly, once the AC power 204 is converted, the DC power rail 210 delivers the DC power to any one or more DC-to-DC converter 212. In some embodiments, the AC-to-DC converter 213 offers bi-directional capability. Therefore, the AC-to-DC converter 213 may receive DC power from load 216 (e.g., an electric vehicle), via DC power rail 210, convert the DC power to AC power, and deliver the AC power to a residence or to the source (e.g., a utility grid, generator, solar inverter, or UPS), via AC power rail 220. In some embodiments, AC-to-DC converter 213 may be any suitable uni-directional AC-to-DC converter or bi-directional AC-to-DC converter.

Control circuitry 206 couples to the DC-to-DC converter 212 via signal bus 218. Although FIG. 2 illustrates one DC-to-DC converter 212, inverter 102 may provide DC power to any number of DC-to-DC converters. In some embodiments, control circuitry 206 applies an inverter setting to adjust power provided through the DC-to-DC converter 212 based on an identification of the source of AC power 204. Control circuitry 206 may transmit the applied inverter setting to the DC-to-DC converter 212 via signal bus 218 or a wireless connection. In some embodiments, the applied inverter setting may be any one of a first inverter setting to reduce power provided to a load (e.g., load 216), a second inverter setting to disable power provided to a load, or a third inverter setting to enable or disable a bidirectional mode of the inverter 102, or a combination thereof. In some embodiments, control circuitry 206 applies the inverter setting based on the identified source (e.g., source of AC power 204), by analyzing AC power 204 received from the source. Control circuitry 206 is configured to analyze the AC power 204 received from source to determine one or more characteristics associated with the source. The characteristics associated with the source of AC power 204 may include one or more of: (a) a voltage ripple root mean square (RMS), (b) a voltage ripple frequency, (c) impedance based on injected reactive current, (d) impedance based on injected harmonic current, or (e) impedance based on signal perturbations, or (f) any combination thereof. Control circuitry 206 then compares the one or more characteristic associated with the source of AC power 204 with reference source characteristics, stored in memory 208, in order to identify the source of AC power 204. Accordingly, control circuitry 206 applies an inverter setting corresponding to the identified source of AC power 204. In some embodiments, control circuitry 206 periodically analyzes the AC power 204 received from the source to determine the one or more characteristic associated with the source. In some embodiments, control circuitry 206 is able to identify an interruption or variation in the received power from source of AC power 204. This may indicate that the source of AC power 204 received has changed (e.g., from the utility grid to a generator). In order to identify the type of source that is providing power to inverter 102, control circuitry 206 then determines one or more characteristics associated with the source of AC power 204 and identify the source by comparing the determined one or more characteristic to reference source characteristics.

In some embodiments, control circuitry 206 determines the voltage ripple RMS or voltage ripple frequency of the AC power 204 received from the source. In some embodiments, control circuitry 206 determines the impedance based on injected signals on the AC power rail 220. The injected signals may include any one of a reactive current signal, harmonic current signal, or signal perturbations.

In some embodiments, reference source characteristics for each respective source from among multiple power sources (e.g., utility grid, solar inverter, generator, or UPS) are initialized by control circuitry 206 by performing a calibration routine. The calibration routine may cause inverter 102 to receive AC power 204 from a respective source from among multiple power sources (e.g., utility grid, generator, solar inverter, or UPS) coupled to the first port 214*a*, and control circuitry 206 to analyze the received AC power 204 from the respective source and determine one or more reference source characteristics for the respective source. In some embodiments, AC-to-DC converter 213 includes sensors which measure sensor data indicative of the one or more source characteristic. This sensor data is accessible to control circuitry 206 via signal bus 218. The AC-to-DC converter may include voltage sensors, current sensors, or any suitable analog multi-meter to measure any one or more of the source characteristics. In some embodiments, the control circuitry 206 analyzes the sensor data indicative of the one or more source characteristic of the AC power 204. This calibration routine may be repeatedly performed by control circuitry 206 for each respective source of the multiple power sources that may provide power to inverter 102. The reference source characteristics for a respective source (e.g., source of AC power 204) stored in memory 208 may include any one or more of (a) a voltage ripple root mean square (RMS), (b) a voltage ripple frequency, (c) impedance based on injected reactive current, (d) impedance based on injected harmonic current, or (e) impedance based on signal perturbations, or (f) any combination thereof.

In some embodiments, inverter 102 includes signal injection circuitry 207, which injects signals 209 onto the AC power rail 220. In some embodiments, AC-to-DC converter 213 may include signal injection circuitry 207. In some embodiments, the switching scheme of AC-to-DC converter 213 may be modified to configure AC-to-DC converter 213 to inject signals in order to determine one or more characteristics associated with the source of AC power 204. The injected signals may be any one of reactive current signal, harmonic current signal, or signal perturbations. Inverter 102 may use the injected signal 209 in order to determine one or more characteristics associated with the source of the AC power 204. The control circuitry 206 may determine the impedance based on injected reactive current signal, impedance based on injected harmonic current, or impedance based on signal perturbations. In some embodiments, control circuitry 206 may determine a characteristic associated with the source of AC power 204 without using the signal injection circuitry 207 such as a voltage ripple RMS or a voltage ripple frequency. In some embodiments, the voltage ripple RMS or voltage ripple frequency may be determined based on a change in the sources of AC power 204 on the AC power rail 220. In some embodiments, the control circuitry 206 determines a characteristic associated with the source of AC power 204 by analyzing sensor data of the AC power signal measured by sensors of the AC-to-DC converter 213.

Figure 3:
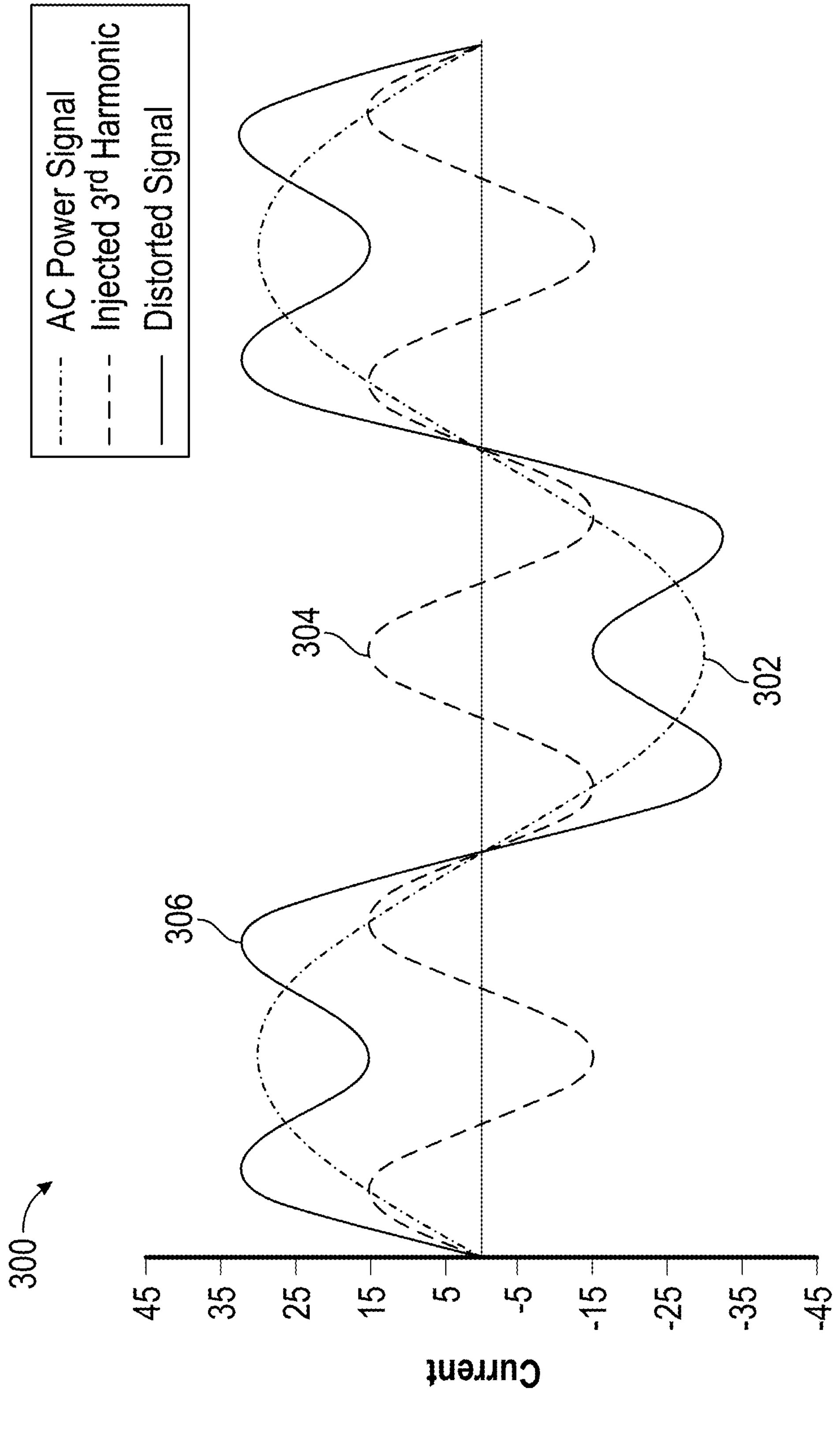
FIG. 3 shows illustrative graph of signals distorted by injected harmonic signals, in accordance with an embodiment of the present disclosure.

FIG. 3 shows illustrative graph 300 of signals 302 distorted by injected harmonic signals 304 resulting in distorted signal 306, in accordance with an embodiment of the present disclosure. In some embodiments, the signal 302 may represent an AC power signal received from a source (e.g., utility grid, generator, UPS, and solar inverter). The injected signal 304 depicted is an injected third harmonic signal. In some embodiments, the injected signal 304 is injected by the signal injection circuitry 207 onto the AC power rail 220, resulting in a distorted signal 306. In some embodiments, the control circuitry 206 may determine one or more characteristics associated with the source of the AC power 204 based on the distorted signal 306, including impedance based on the voltage and current of the distorted signal 306. For example, an impedance (Z) of the AC power rail 220 may be determined by measuring the voltage (V) and current (I) of the AC power 204. The impedance (Z) is defined as:

$$Z = R + X_L,$$

$$Z = \frac{V}{I} + j\omega L,$$

wherein the determined change in impedance may be used to determine a switch in AC power 204 provisions from a first source to a second source. In some embodiments, the voltage (V) and current (I) of the AC power signal on AC power rail 220 are determined based on sensor data. In some embodiments, an injected signal of angular frequency (ω) transmitted onto the AC power rail 220 may be used to determine the inductance (L) of the AC power rail 220. The inductance may be determined by control circuitry 206 based on the following equation:

$$L = \frac{\Delta V_L}{\omega I_L},$$

wherein $\Delta V_L$ is a change in voltage and $I_L$ is the current provided by the injected signal (e.g., a reactive current signal or harmonic current signal), each of which may be determined by voltage sensors and current sensors of the AC-to-DC converter 213. When the inductance of the AC power rail 220 is determined by control circuitry 206, a change in impedance of the source may be determined, indicating a new source of AC power 204. For example, inverter 102 may receive AC power 204 from a utility grid 103 via the AC power rail 220 with a first impedance and the control circuitry 206 periodically receives sensor data from AC-to-DC converter 213. When control circuitry 206 analyzes the sensor data, control circuitry 206 determines a second impedance from the AC power rail 220, which may indicate a change in the source of AC power 204. In some embodiments, control circuitry 206 further analyzes the sensor data to determine one or more source characteristics in order to determine which source is now providing AC power to the inverter 102.

Figure 4:
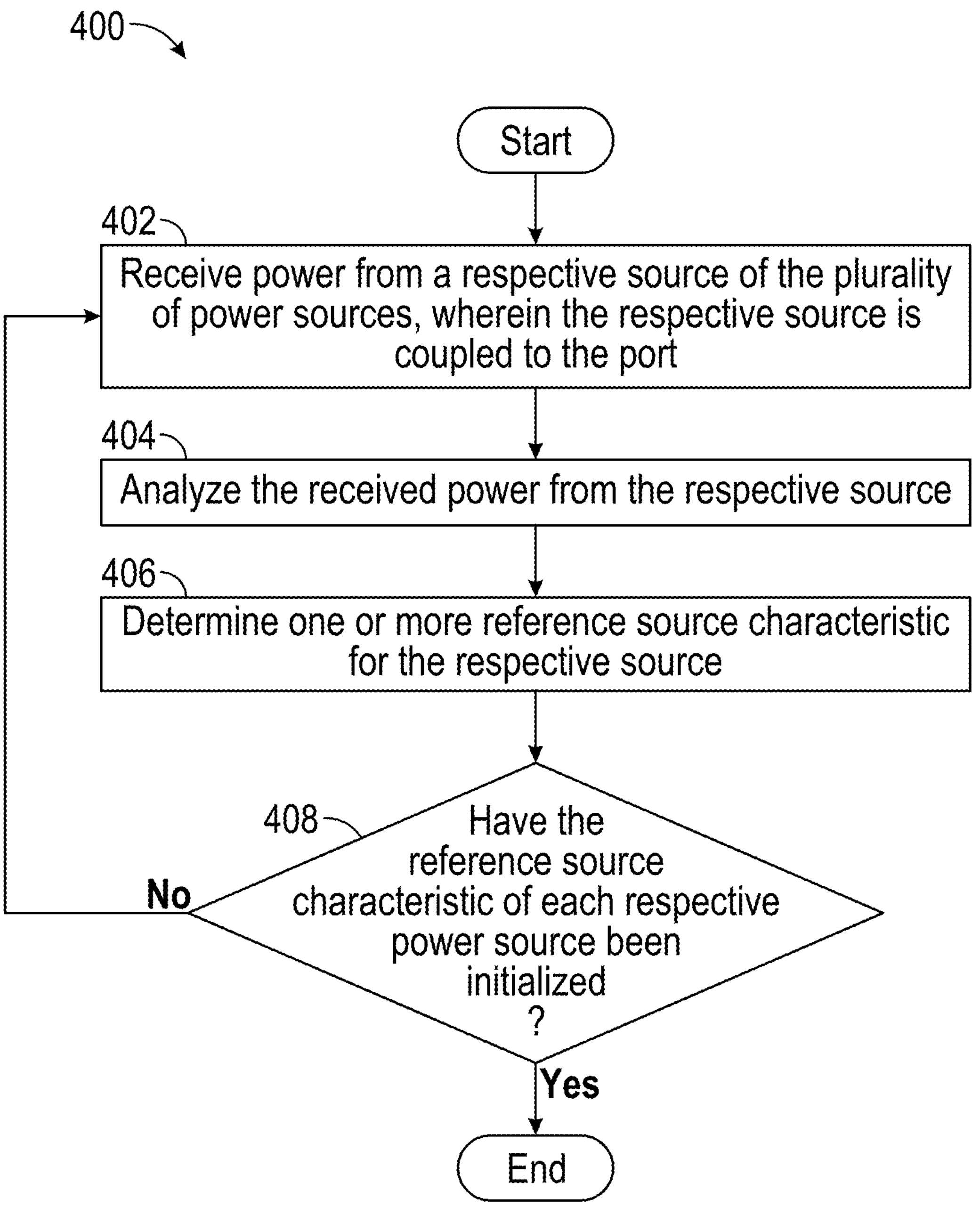
FIG. 4 shows an illustrative flowchart depicting a process for initializing reference source characteristics for at least one source on an inverter, in accordance with an embodiment of the present disclosure.

FIG. 4 shows an illustrative flowchart depicting a process 400 for initializing reference source characteristics for at least one source on an inverter, in accordance with an embodiment of the present disclosure. In some embodiments, process 400 is executed by control circuitry 206 of the inverter 102, and the initialized reference source characteristics are stored in memory 208. Process 400 may be referred to as a calibration routine. In some embodiments, the calibration routine may be automatically performed once the inverter 102 is installed in inverter system 100, or may be performed in response to a user or technician input.

At 402, inverter 102 receives AC power 204 from a respective source of the plurality of power sources, wherein the respective source is coupled to a port (e.g., first port 214*a*). In some embodiments, the plurality of power sources may include any one or more of a utility grid, a generator, a solar inverter, or a UPS, or a combination thereof. In some embodiments, the source is coupled to inverter 102 by a manual or automatic switch performed by a technician or user. For example, a utility grid may be coupled as the source to inverter 102. Once the calibration routine is completed for the utility grid, a user or technician may actuate a switch in order for the inverter to receive power from another source (e.g., a generator, solar inverter, or UPS). In some embodiments, the manual or automatic switch may be a component of changeover circuitry placed externally from inverter 102.

At 404, control circuitry 206 analyzes the received power from the respective source. In some embodiments, control circuitry 206 analyzes the power received from the respective source by injecting any one or more of reactive current, harmonic current or signal perturbations on the AC power rail 220 in order to determine an impedance associated with the respective source in response to a respective injected signal. In addition, control circuitry may analyze the power received for voltage ripple frequency or voltage ripple RMS values. In some embodiments, control circuitry 206 performs either time domain analysis or frequency domain analysis on sensor data indictive of at least one reference source characteristic in order to identify variations in voltage ripple RMS or voltage ripple frequency of the signal of the AC power 204, which may be indicative of a change in the source of AC power 204 (i.e., a change from the utility grid to the generator). In some embodiments, sensor data includes voltage data of AC power 204, which may be used when determining any variations or interruptions in AC power provisions from a respective source.

At 406, control circuitry 206 determines one or more reference source characteristic for the respective source. The analysis of the power received from the respective source allows control circuitry 206 to determine one or more reference source characteristic for the respective source. In some embodiments, the one or more reference source characteristics may be any one of a voltage ripple RMS, a voltage ripple frequency, impedance based on injected reactive current, impedance based on injected harmonic current, or impedance based on signal perturbations, or any combination thereof. In some embodiments, the determined one or more reference source characteristic initialized for each respective source is based on the analysis of control circuitry 206 of the sensor data of AC power 204 or injected signals on AC power rail 220. For example, without injecting signals (e.g., harmonic current signals, reactive current signals, or signal perturbations) the one or more reference source characteristic of the utility grid may include voltage ripple RMS and voltage ripple frequency of the AC power 204 received from the utility grid. In some embodiments, control circuitry 206 determines a source fingerprint for each respective source of the plurality of power sources (e.g., utility grid, generator, solar inverter, and UPS), where each fingerprint includes multiple reference source characteristics. Memory 208 is configured to store each fingerprint or corresponding reference characteristics for each respective source. In some embodiments, each stored fingerprint or any corresponding reference source characteristic for a respective source may be overwritten, or updated to create an updated fingerprint or corresponding one or more reference source characteristic for a respective source. Each respective fingerprint or corresponding one or more reference source characteristic stored in memory 208 is accessible to control circuitry 206. In some embodiments, each respective reference source characteristic of the respective source includes a respective range of values which corresponds to the respective source.

At 408, control circuitry 206 determines whether the reference source characteristics of each respective power source have been initialized. In some embodiments, this determination is made based on a user input received over inverter communications 222. In some embodiments, inverter communications 222 is able to communicate with changeover circuitry 104 or sources of AC power 204 to determine whether any additional power sources are available to be initialized. When, at 406, the control circuitry determines that the reference source characteristics for each respective power source have been initialized, the method terminates. If the control circuitry determines that the reference source characteristics for any additional power source is to be initialized, control circuitry repeats process 400, by returning to step 402, for each respective power source for which the reference source characteristics are to be updated.

Figure 5:
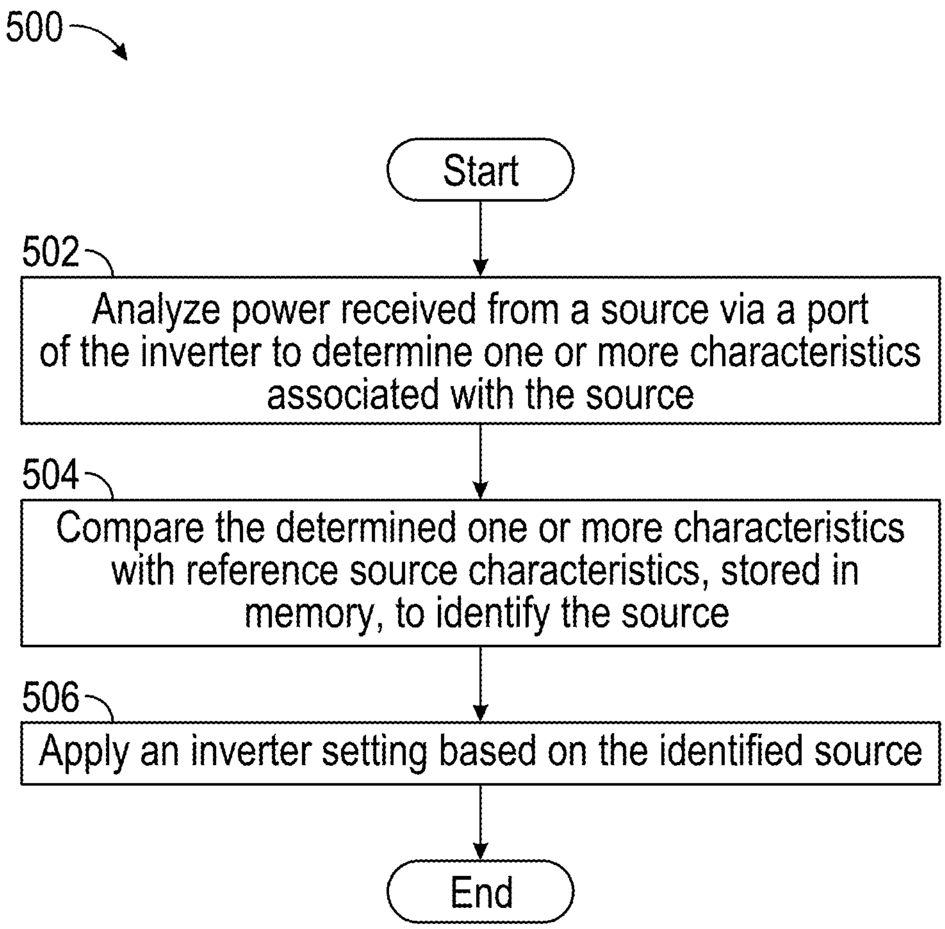
FIG. 5 shows an illustrative flowchart depicting an exemplary process for operating an inverter, in accordance with an embodiment of the present disclosure.

FIG. 5 shows an illustrative flowchart depicting an exemplary process 500 for operating an inverter, in accordance with an embodiment of the present disclosure. In some embodiments, process 500 is executed by control circuitry 206 of the inverter 102.

At 502, the control circuitry analyzes the power to determine one or more characteristics associated with the source. In some embodiments, control circuitry 206 periodically (e.g., every 5, 10, 15, 20, etc. seconds) analyzes the AC power 204 received from a source to determine the one or more characteristic associated with the source. In some embodiments, control circuitry 206 is able to identify an interruption or variation in the received AC power 204 from the source. This may indicate that the source of power received by inverter 102 may have changed (e.g., from the utility grid 103 to a generator 105). In order to identify the type of source that is providing power to inverter 102, control circuitry 206 determines one or more characteristics associated with the source. In some embodiments, control circuitry 206 analyzes the AC power 204 received from the source by causing signal injection circuitry 207 to inject any one or more of reactive current, harmonic current or signal perturbations on the AC power rail 220 in order to determine an impedance associated with the respective source in response to a respective injected signal. In addition, control circuitry may analyze the power received for voltage ripple frequency or voltage ripple RMS values. In some embodiment, the analysis performed at 502 is the same analysis performed at 404 and 406.

At 504, the control circuitry compares the determined one or more characteristics with the reference source characteristics to identify the source. In some embodiments, control circuitry 206 compares the determined one or more characteristic to the one or more reference source characteristic corresponding to each respective source to determine how well they match. In some embodiments, control circuitry 206 may compare the determined one or more characteristic to respective source fingerprints stored in memory 208 for each respective source.

At 506, the control circuitry applies an inverter setting based on the identified source. Each inverter setting, when applied, may adjust the way inverter 102 provides and receives power. In some embodiments, an inverter setting may enable or disable a bidirectional mode, which allows inverter to provide and receive power to each of the source and load 216 (e.g., when the identified source is a generator or a solar inverter). In some embodiments, control circuitry 206 applies an inverter setting to adjust power provided through the DC-to-DC converter 212 based on an identification of the source of AC power 204 (e.g., power may be reduced when the identified source is other than a utility grid). In some embodiments, the applied inverter setting may be any one of a first inverter setting to reduce power provided to a load (e.g., load 216), a second inverter setting to disable power provided to a load (e.g., when the identified source is a UPS), or a third inverter setting to enable or disable a bidirectional mode of the inverter 102, or a combination thereof. In some embodiments, control circuitry 206 applies the inverter setting based on the identified source (e.g., source of AC power 204), by analyzing AC power 204 received from the source.

For example, inverter 102 may be coupled to and receive power from a utility grid 103 and coupled to two loads: an electric vehicle (EV) and a stationary battery converter. In some embodiments of such an example, interruptions or variations may occur on the AC power rail 220 which control circuitry 206 may detect. Such an interruption or variation in power received from source of AC power 204 may indicate a change in power source which provides AC power to inverter 102. Control circuitry 206 then analyzes the power received to determine one or more source characteristic which is used to identify the source by comparing the one or more characteristic to one or more reference source characteristic, stored in memory 208, for each respective power source. For example, control circuitry 206 may identify UPS 107 as a new source providing power to inverter 102. When control circuitry 206 identifies the new source as UPS 107, the control circuitry 206 may apply an inverter setting that enables the bidirectional mode in order to receive DC power from loads (e.g., load 216) such as the EV. This may be useful as the UPS 107 may provide a limited amount of AC power to loads in a house, including inverter 102. By enabling the bidirectional mode, the power from a load (e.g., and EV) can be used to power other loads in a house during power interruption. In some embodiments, control circuitry 206 may apply an inverter setting for power rationing, which may reduce power provisions to a load, such as an EV.

Figure 6:
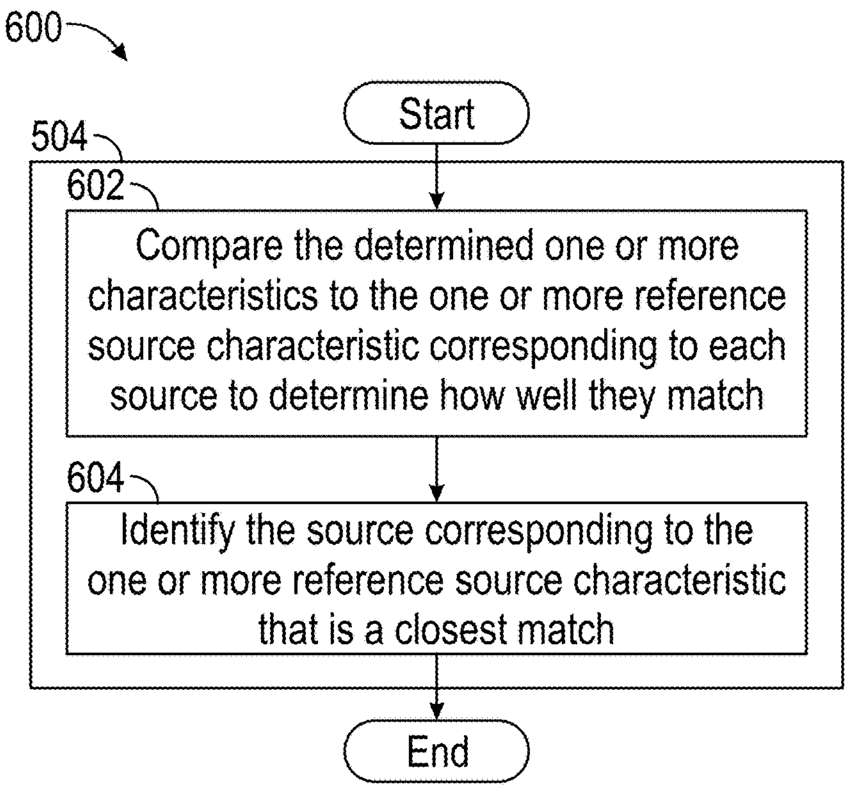
FIG. 6 shows an illustrative flowchart depicting a subprocess for comparing the determined one or more characteristics with the reference source characteristics to identify the source, in accordance with an embodiment of the present disclosure.

FIG. 6 shows an illustrative flowchart depicting a subprocess 600 for comparing the determined one or more characteristics with the reference source characteristics to identify the source, in accordance with an embodiment of the present disclosure. In some embodiments, subprocess 600 corresponds to step 504 of FIG. 5 and is executed by control circuitry 206.

At 602, the control circuitry 206 compares the determined one or more characteristic to the one or more reference source characteristic corresponding to each respective source to determine how well they match. In some embodiments, control circuitry 206 may compare the determined one or more characteristic to each respective source fingerprint for each respective source. In some embodiments, each reference source characteristic of each respective source includes a respective range of values. For a respective reference source characteristic which is being compared, control circuitry 206 may identify a source providing AC power 204 when the respective determined characteristic of the source is within the respective range of values of the respective. In some embodiments, control circuitry 206 may store data in memory 208 which corresponds to a respective source of one or more reference source characteristic that is a closest match, wherein the data may be overwritten when another one or more reference source characteristics are of a closer match to the determined one or more characteristic of the source of the AC power 204. In some embodiments, if the control circuitry 206 cannot identify the power source based on the one or more characteristics associated with the source of AC power 204, the control circuitry 206 may apply a default inverter setting to the inverter 102.

At 604, the control circuitry 206 identifies the source corresponding to the one or more reference source characteristic that is a closest match. In some embodiments, control circuitry 206 may identify the source corresponding to a respective source fingerprint that is a closest match. In some embodiments, each respective range of values for the reference source characteristics of a source may include a respective mean value, which may be defined as the average of the respective range of values. In some embodiments, for each determined source characteristic of a given source fingerprint, control circuitry determines a respective difference between each determined source characteristic and the respective mean value for each corresponding reference source characteristic of each source. The control circuitry 206 may then determine, for each respective reference source, a sum of the differences for each of the reference source characteristics of the respective reference source. In such embodiments, the source identified as the closest match by control circuitry 206 is the source with the smallest sum of differences. Once control circuitry 206 identifies the source of AC power 204, control circuitry 206 is configured to apply an inverter setting to adjust how inverter 102 provides and receives power from the identified source.

Figure 7:
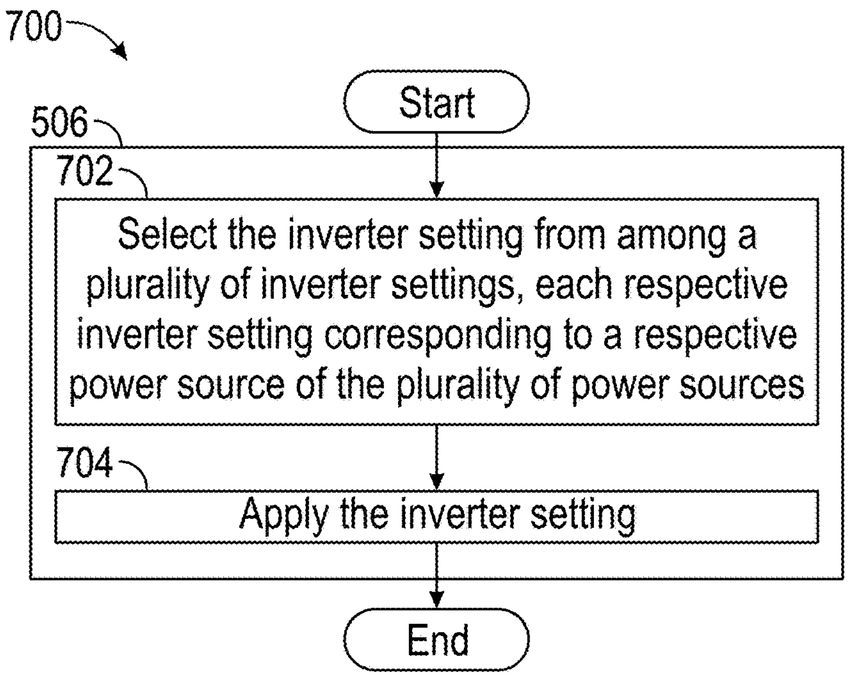
FIG. 7 shows an illustrative flowchart depicting a subprocess for applying an inverter setting based on the identified source, in accordance with an embodiment of the present disclosure.

FIG. 7 shows an illustrative flowchart depicting a subprocess 700 for applying an inverter setting based on the identified source, in accordance with an embodiment of the present disclosure. In some embodiments, subprocess 700 corresponds to step 506 of FIG. 5 and is executed by control circuitry 206.

At 702, the control circuitry 206 selects the inverter setting from among a plurality of inverter settings, each respective inverter setting corresponding to a respective power source of the plurality of power sources. In some embodiments, the applied inverter setting may be any one of (a) a first inverter setting to reduce power provided to a load (e.g., load 216), (b) a second inverter setting to disable power provided to a load, or (c) a third inverter setting to enable or disable a bidirectional mode of the inverter 102, or (d) a combination thereof. In some embodiments, control circuitry 206 may select an inverter setting in response to control circuitry 206 identifying an interruption or variation in the received AC power 204 from the source. In some embodiments, control circuitry 206 periodically analyzes the AC power 204 received from source.

At 704, the control circuitry 206 applies the inverter setting. The inverter setting adjusts whether AC power 204 is received or provided by inverter 102 to the coupled source. In some embodiments, the inverter setting adjusts how inverter 102 provides power on the DC power rail 210 and/or whether inverter 102 provides or receives AC power 204 on the AC power rail 220. In embodiments when the inverter 102 is in a bidirectional mode, the inverter setting may adjust whether inverter 102 provides or receives power on each of the DC power rail 210 and the AC power rail 220. In some embodiments, control circuitry 206 may transmit control signals on the signal bus 218 in order to adjust how the DC-to-DC converter 212 functions when providing DC power or receiving DC power to a load (e.g., load 216) via DC power rail 210.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An inverter, comprising:

a port configured to receive AC power;

memory storing reference source characteristics for each of a plurality of AC power sources, wherein the reference source characteristics are predetermined; and control circuitry configured to:

analyze the AC power, from a first AC power source of the plurality of AC power sources, to determine one or more characteristics associated with the first AC power source;

based on analyzing the AC power, identify an interruption or variation in the AC power caused by a change to a second AC power source of the plurality of AC power sources;

determine one or more characteristics associated with the second AC power source;

compare the determined one or more characteristics with the reference source characteristics to identify the second AC power source from among the plurality of AC power sources; and apply an inverter setting of the inverter based on the identified second AC power source to provide power to a DC load.

2. The inverter of claim 1, wherein the one or more characteristics associated with the second AC power source comprises one or more of:

a voltage ripple root mean square (RMS);

a voltage ripple frequency;

an impedance based on an injected reactive current;

an impedance based on an injected harmonic current; or an impedance based on a signal perturbation; or any combination thereof.

3. The inverter of claim 1, wherein the reference source characteristics comprise, for each of the plurality of AC power sources, a source fingerprint comprising a plurality of reference source characteristics.

4. The inverter of claim 1, wherein the control circuitry is further configured to:

periodically analyze the AC power to periodically determine the one or more characteristics associated with the first AC power source; and compare the periodically determined one or more characteristics with the reference source characteristics to identify the change to the second AC power source.

5. The inverter of claim 1, wherein the inverter setting is selected from a plurality of inverter settings, and wherein the plurality of inverter settings comprises:

a first inverter setting to reduce DC power provided to the DC load;

a second inverter setting to disable DC power provided to the DC load; and a third inverter setting to enable or disable a bidirectional mode of the inverter.

6. The inverter of claim 1, wherein the control circuitry is further configured to perform a calibration routine to initialize the reference source characteristics for each respective AC power source from among the plurality of AC power sources, wherein to perform the calibration routine the control circuitry is configured to:

(a) receive reference AC power from a respective AC power source of the plurality of AC power sources, wherein the respective AC power source is coupled to the port;

(b) analyze the reference AC power from the respective AC power source;

(c) determine one or more reference source characteristic for the respective AC power source;

(d) repeat (a)-(c) for each other respective AC power source of the plurality of AC power sources; and (e) store results of (d) in the memory before analyzing the AC power to determine the one or more characteristics.

7. The inverter of claim 1, wherein to compare the determined one or more characteristics with the reference source characteristics to identify the second AC power source, the control circuitry is configured to:

compare the determined one or more characteristics to one or more reference source characteristics corresponding to each respective AC power source to determine how well they match; and identify the second AC power source corresponding to the one or more reference source characteristics that is a closest match.

8. The inverter of claim 1, wherein the control circuitry is further configured to:

select the inverter setting from among a plurality of inverter settings, each respective inverter setting corresponding to a respective AC power source of the plurality of AC power sources.

9. The inverter of claim 1, wherein the port is configured to receive power from any one of:

a generator;

an uninterruptible power supply (UPS);

a solar inverter; or a utility grid; or a combination thereof.

10. The inverter of claim 1, wherein the port is a first port and wherein the inverter is a bidirectional inverter capable of receiving power from a load via a second port, which is provided to the second AC power source via the first port.

11. A method comprising:

analyzing AC power received from a first AC power source, of a plurality of AC power sources, via a port of an inverter to determine one or more characteristics associated with the first AC power source;

based on analyzing the AC power, identify an interruption or variation in the AC power caused by a change to a second AC power source of the plurality of AC power sources;

determine one or more characteristics associated with the second AC power source;

comparing the determined one or more characteristics with reference source characteristics to identify the second AC power source from among the plurality of AC power sources, wherein the reference source characteristics are predetermined for each of the plurality of AC power sources and stored in memory; and applying an inverter setting of the inverter based on the identified second AC power source to provide power to a DC load.

12. The method of claim 11, wherein analyzing the AC power to determine the one or more characteristics associated with the second AC power source comprises determining any one or more of:

a voltage ripple root mean square (RMS);

a voltage ripple frequency;

an impedance based on an injected reactive current;

an impedance based on an injected harmonic current; or an impedance based on a signal perturbation; or any combination thereof.

13. The method of claim 11, further comprising:

periodically analyzing the AC power to periodically determine the one or more characteristics associated with the first AC power source; and comparing the periodically determined one or more characteristics with the reference source characteristics to identify the change to the second AC power source.

14. The method of claim 11, wherein applying an inverter setting based on the identified second AC power source comprises selecting the inverter setting from a plurality of inverter settings, wherein the plurality of inverter settings comprises:

a first inverter setting to reduce DC power provided to the DC load;

a second inverter setting to disable DC power provided to the DC load; and a third inverter setting to enable or disable a bidirectional mode of the inverter.

15. The method of claim 11, further comprising:

performing a calibration routine to initialize the reference source characteristics stored in the memory for each respective AC power source from among the plurality of AC power sources, wherein performing the calibration routine comprises:

(a) receiving reference AC power from a respective source of the plurality of AC power sources, wherein the respective AC power source is coupled to the port;

(b) analyzing the reference AC power from the respective AC power source;

(c) determining one or more reference source characteristic for the respective AC power source; and (d) repeating (a)-(c) for each other respective AC power source of the plurality of AC power sources; and (e) storing results of (d) in the memory before analyzing the AC power to determine the one or more characteristics.

16. The method of claim 11, wherein comparing the determined one or more characteristics with reference source characteristics to identify the second AC power source comprises:

comparing the determined one or more characteristics to one or more reference source characteristic corresponding to each respective AC power source of the plurality of AC power sources to determine how well they match; and identifying the second AC power source corresponding to the one or more reference source characteristic that is a closest match.

17. The method of claim 11, wherein applying an inverter setting based on the identified second AC power source comprises:

selecting the inverter setting from among a plurality of inverter settings, each respective inverter setting corresponding to a respective AC power source of the plurality of AC power sources.

18. A non-transitory computer-readable medium having non-transitory computer-readable instructions encoded thereon that, when executed by a control circuitry of an inverter, cause the control circuitry to:

analyze AC power received from a first AC power source, of a plurality of AC power sources, via a port of the inverter to determine one or more characteristics associated with the first AC power source;

based on analyzing the AC power, identify an interruption or variation in the AC power caused by a change to a second AC power source of the plurality of AC power sources;

determine one or more characteristics associated with the second AC power source;

compare the determined one or more characteristics with reference source characteristics to identify the second AC power source from among the plurality of AC power sources, wherein the reference source characteristics are predetermined for each of the plurality of AC power sources and stored in memory; and apply an inverter setting of the inverter based on the identified second AC power source to provide power to a DC load.

* * * * *